Feb. 14, 1950 N. D. COGGESHALL 2,497,208

ELECTRICAL LOGARITHM COMPUTER

Filed Aug. 27, 1948 2 Sheets-Sheet 1

INVENTOR.
NORMAN D. COGGESHALL
BY G. M. Houghton
his ATTORNEY

Feb. 14, 1950 N. D. COGGESHALL 2,497,208

ELECTRICAL LOGARITHM COMPUTER

Filed Aug. 27, 1948 2 Sheets-Sheet 2

INVENTOR.
NORMAN D. COGGESHALL
BY A. M. Houghton
His ATTORNEY

Patented Feb. 14, 1950

2,497,208

UNITED STATES PATENT OFFICE 2,497,208

ELECTRICAL LOGARITHM COMPUTER

Norman D. Coggeshall, Verona, Pa., assignor to Gulf Research & Development Company, Pittsburgh, Pa., a corporation of Delaware Application August 27, 1948, Serial No. 46,399

4 Claims. (Cl. 235—61)

This invention concerns an electrical apparatus for computing the logarithm of numbers and more particularly concerns a logarithmic potentiometer having a high degree of precision.

In many mathematical computations it is often necessary to determine logarithms to some predetermined or preassigned base. Such computations occur in various general computing systems and are also often encountered in various types of control and recording apparatus. While various empirical means have been devised for electrically obtaining a logarithmic signal, these devices have generally been subject to errors of calibration and errors in their empirical design which are eliminated by the present invention. The present invention is useful as an element of an electric computing machine, and is particularly useful in that the logarithmic function is inherent in a very simple geometrical design of the electric current-conducting medium.

It is accordingly an object of this invention to provide means for generating an electrical signal proportional to the logarithm of a number to which the machine is set.

It is a further object of this invention to provide apparatus for obtaining a logarithm signal of high precision.

It is a still further object of this invention to provide a potentiometer by means of which a logarithmic variation of potential may be obtained with a high degree of precision.

It is a still further object of this invention to provide a logarithm computer by means of which logarithms may be computed to any desired base.

It is a further object of this invention to provide a logarithm computing apparatus which is extremely simple in its construction and which is inherently precise.

Figure 1:
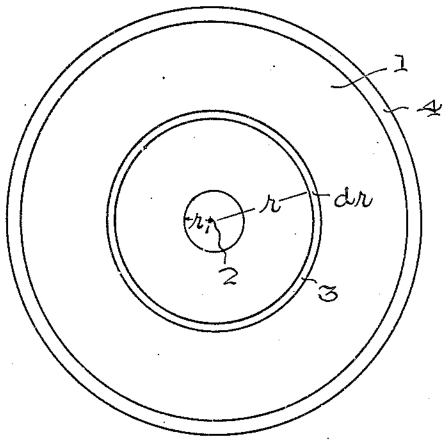
Figure 4:
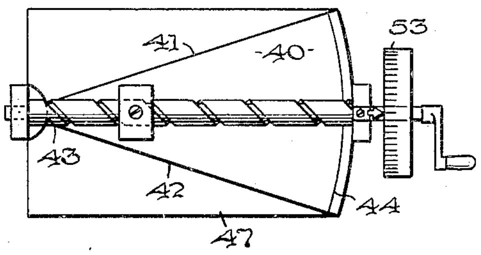
Figure 5:
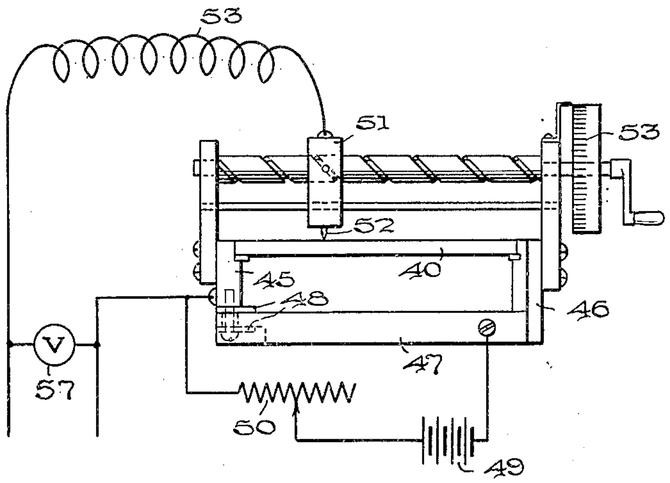
Figure 2:
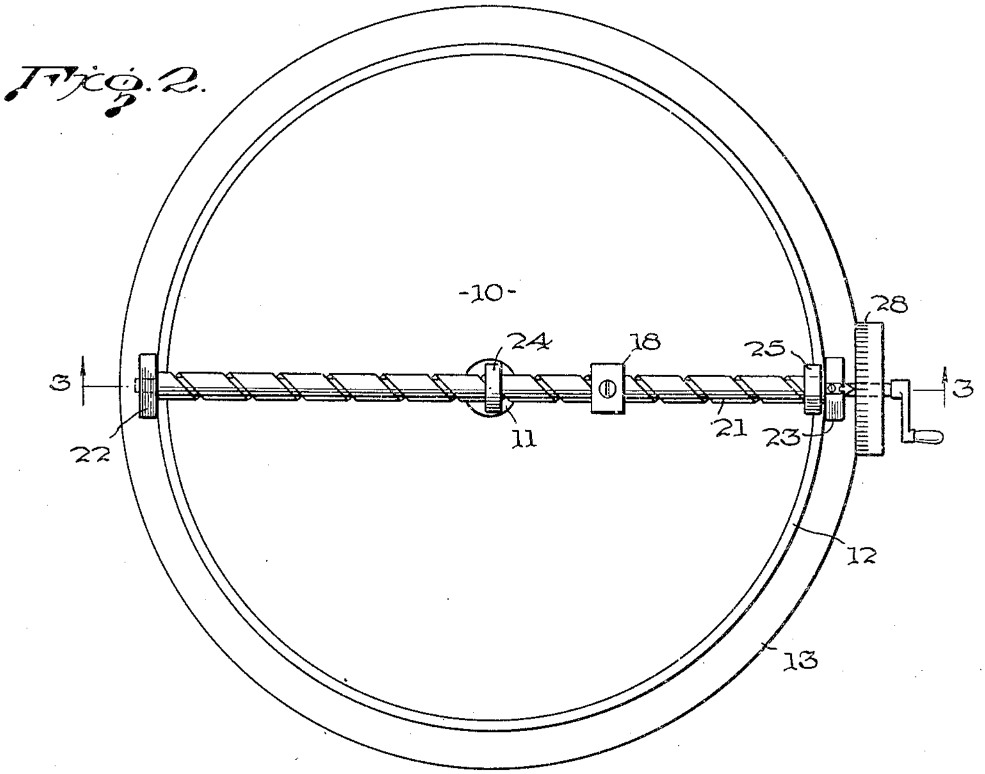
Figure 3:
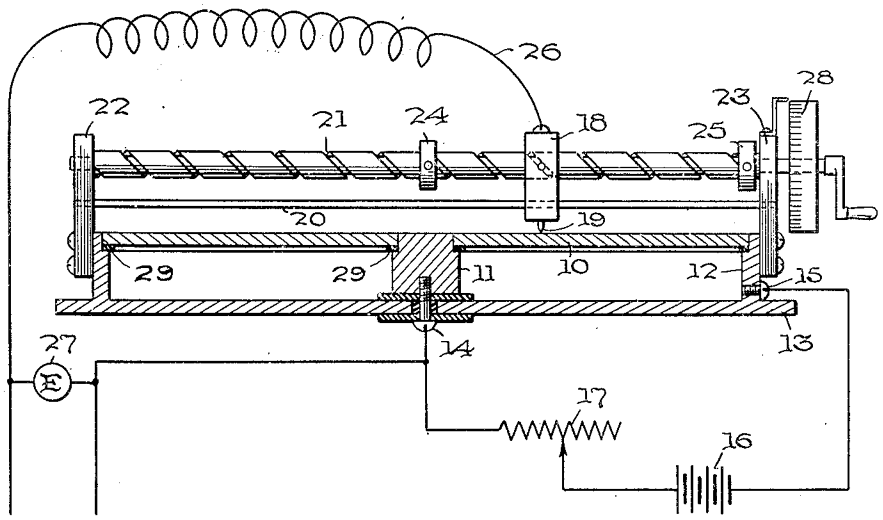

These and other objects of this invention are attained as described in the following specification, of which the accompanying figures form a part, and in which Figure 1 is a mathematical diagram used for explaining the principles of my invention;

Figures 2 and 3 show respectively a top and side view (partly in section) of an embodiment of my invention wherein a circular concentric annular disc is used as the electrical current-carrying or resistance medium; and Figures 4 and 5 show respectively a top and side view of a preferred embodiment of my invention wherein a sector of a circular annular disc is used as the current-carrying medium.

This invention makes use of the fact that when an electric current flows radially outward in a thin disc there results a radial distribution of potential which is logarithmic. This may be explained by reference to Figure 1, in which numeral 1 indicates a circular disc of uniform resistivity $\rho$ and uniform thickness $t$. Assume that an electric current is introduced at the center point 2 and collected uniformly around the periphery of 1 by an outer ring 4 having a low resistance. Since the resistance of the disc along any radius from 2 to 4 is the same, there will be a uniform circumferential distribution of the current as it flows radially outward. Let an annular ring of the disc, such as 3, have a radius $r$ and a radial width $dr$. Then the resistance across this ring will be expressed by $$dR=\rho\frac{dr}{2t\pi r}$$

The total resistance of the disc from any inner radius $r_1$ out to the radius $r$ may be obtained by integrating as follows:

$$R=\frac{\rho}{2t\pi}\int_{r_1}^{r}\frac{dr}{r}=\frac{\rho}{2t\pi}\Big[\log r\Big]_{r_1}^{r}$$

$$R=\frac{\rho}{2t\pi}(\log r-\log r_1)$$

$$R=\frac{\rho}{2t\pi}\log\frac{r}{r_1}$$

If the current which flows from 2 to 4 is $i$ then the potential drop $iR$ will be given by $$e=i\frac{\rho}{2t\pi}\log\frac{r}{r_1}$$

If we let $i\rho/2t\pi=k$ and make $r_1=1$ then we have simply $e=k\log r$.

In this invention such a disc may be of suitable electrically uniform conducting (but nevertheless resistive) material and arranged so that the current enters at a radius ($r_1$) which may conveniently be one scale unit. The constant $k$ is then set by adjusting the current through the disc as explained later.

The foregoing principles are employed in my invention as shown in Figures 2 and 3. Circular concentric annular disc 10, may be of metal foil, or graphite, or any well known resistance material molded in the form of a disc of uniform thickness and resistivity; or such a disc may comprise a coating of foil or graphite on the surface of a supporting insulating disc, or may be of other well known resistance material. It is merely necessary that the conducting portion be in the shape of a relatively thin, uniform, concentric, circular, annular disc.

The disc may be supported at the center by a low resistance metal bushing 11 which makes uniform electrical contact to the inner edge of the disc. It is supported on the outside by a low resistance metal ring 12 which makes electrical contact uniformly around the periphery of the disc. The disc 10 may rest on insulation 29 which in turn rests against a shoulder on the supporting elements 11 and 12. The ring 12 may be mounted on a base plate 13 of any convenient form and the bushing 11 is also supported on the base plate 13 and insulating therefrom. Electrical connection may be made to bushing 11 by means of a screw such as 14 insulated from the base plate and electrical connection is made to the ring 12 by means of screw 15. A battery 16 and adjustable series resistor 17 are placed in the circuit to supply electric current to the disc 10.

Mounted above the disc 10 is a movable slider or carrier 18 having a spring pressed contact 19 which bears against the surface of the disc 10. The carrier 18 is guided on rod 20 and screw 21 with which it engages, the screw serving thereby as a means for moving the slider along the radius of the disc 10. Rod 20 and screw 21 are supported diametrically across the disc 10 by means of end bearings 22 and 23, which are of insulating material and conveniently supported on ring 12. The screw 21 may be extended through bearing 23 and carry a crank or adjusting wheel and an indicator dial 28 which indicates the radial position of the contact 19. Screw 21 may be equipped with an inner stop 24 which is set at a point so that the contactor 19 just begins to contact disc 10 and an outer stop 25 set at some convenient outer limit of the scale. The latter is not necessarily the outer boundary of the disc, i. e. the disc may extend beyond this point. A flexible lead 26 connects to contactor 19 and serves to tap off the logarithmic voltage desired, the potential being measured between contactor 19 and center post 11 and read on a meter 27, which is preferably of a high resistance or potentiometer type.

The dial 28 and the screw 21 are together arranged so that this dial reads 1.000 when the carriage 18 is against the inner stop 24 and the contactor 19 just begins to contact the disc 10. There will at this point be zero potential indicated at 27. The screw 21 and the indicator dial may then be turned to move the carriage 18 outward to some convenient standard point, say the outer periphery of the disc, which may be conveniently made ten times the radius of the inner bushing 11. A potential will at this point be indicated at 27 and this potential may be adjusted by means of the resistor 17 to indicate the value of the logarithm to any preassigned base, for the radius indicated on dial 28.

Thus, if it is desired to use the device to compute logarithms to the base ten, resistor 17 is adjusted so that meter 27 reads 1.000 volts when the dial 28 is set at radius 10.000. Then for all intermediate numbers between 1.000 and 10.000 as set on dial 28, the meter 27 will indicate the logarithm to the base ten.

If it is desired to determine the logarithm of numbers to the base $e$ the resistor 17 is adjusted so that meter 27 reads 2.302 volts when the dial 28 is set at radius 10.000. Intermediate settings of dial 28 then result in the meter reading 27 being the natural logarithm of the dial setting. It is apparent that any other convenient base may be chosen for a particular problem or application, it being only necessary to know the logarithm of one point on the dial scale to the base desired. This evaluates the constant $k$ in the equation $e=k \log r$.

It is apparent that since the distribution of current in the disc is uniform and the current lines of flow are radial one may use instead of a disc, a sector of an annulus as shown in Figures 3 and 4 as 40. Such a sector of an annulus may be cut with straight radial edges 41 and 42 and concentric circular inner and outer boundaries 43 and 44, respectively, uniform electrical contact being made to circular inner edge 43 by means of low resistance metal post 45 and uniform contact to the outer circular edge being by means of outer low resistance metal support 46, the latter conveniently being made integral with the base 47. Base 47 supports at its opposite end the post 45 insulated therefrom by means of washers 48. Current flow is set up by passing a current from 45 to 46 through battery 49 and rheostat 50. Carriage 51, insulated from the base and carrying contactor 52, is arranged in a manner similar to that shown in Figures 2 and 3, dial 53 being arranged to read 1.000 when the contactor 52 is just beginning to make contact with the inner radius of sector 40 and reads 10.000 at some convenient outer radius ten times as large. The latter is not necessarily the outer boundary of the annular sector and the sector may extend beyond this point. Logarithmic voltage is then obtained from a flexible lead 53 attached to the carrier 51 and connected to the contactor 52. The potential difference is measured by meter 57 connected between the lead 53 and the inner post 45. It can be shown mathematically that this variation of potential is also logarithmic exactly as in the case of a disc. Adjustment of the current through the potentiometer element 40 is made in the same manner as that described in connection with Figures 2 and 3 and is accomplished by adjusting rheostat 50.

It is to be noted that it is not necessary to calibrate the resistor 10, Figure 2, or 40, Figure 4. If the disc or the disc sector is accurately machined and uniform in thickness and resistivity, this being relatively simple of attainment, then only one point of calibration, as above indicated, is required to adjust the base to which logarithmic variation applies. This one setting calibrates the entire unit with a high degree of precision. This results because the logarithmic variation in potential is not introduced by any empirical form of the resistor, but rather results as an inherent property of the radial current flow in the thin conducting medium employed.

In order to preserve the precision of my invention, the terminal elements 11 and 12 of Figures 2 and 3 and 45 and 46 of Figures 4 and 5 should be of much lower resistivity than the disc 10 or sector 40. The terminal elements are preferably made of copper or silver. Further, mechanical refinements in the slider-moving screw may be made in a manner well known in the art, and lost motion in the contactor 19 or 52 is to be avoided. Also the indicator dial and the adjusting screw may be made so that the number of revolutions is indicated and the dial may have a vernier as is customary in devices of this type.

My invention may also be used for obtaining antilogs in well known manner and in fact may be used for any computation involving the logarithm according to the well known properties of the logarithm function.

The term "sector-like member," as used in the claims is defined as a sector having any finite angle from 0 to 360° included between its radial boundaries. When the included angle is 360°, such sector-like member takes the form of a disc.

What I claim as my invention is:

1. Apparatus for obtaining an electric signal which varies in a logarithmic manner with a linearly varying adjustment comprising a uniform concentric circular annular disc of electrically conducting material, means for flowing an electric current uniformly between the inner circular edge of said disc and the outer circular edge of said disc, means for electrically contacting a point on the surface of said disc, means for radially adjusting said contact point, and an output circuit connected between said contact point and an edge of said disc.

2. Apparatus for obtaining an electric signal which varies in a logarithmic manner with a linearly varying adjustment comprising a uniform concentric circular annular sector-like member of electrically conducting material, means for flowing an electric current uniformly between the inner circular edge of said sector-like member and the outer circular edge of said sector-like member, means for electrically contacting a point on the surface of said sector-like member, means for radially adjusting said contact point, and an output circuit connected between said contact point and a circular edge of said sector-like member.

3. Apparatus for computing logarithms comprising a uniform concentric circular annular disc of electrical conducting material, means for introducing an electric current at the inner edge of said disc, means for gathering the electric current uniformly around the outer periphery of said disc, a radially adjustable contactor contacting the surface of said disc, means for moving said contactor radially along said disc, means for positioning said contactor at a known radius, means for adjusting the electric current flowing through said disc, and means for measuring the electric voltage between said contactor and an edge of said disc.

4. Apparatus for computing logarithms comprising a uniform concentric circular annular sector-like member of electrical conducting material, means for introducing an electric current at an inner circular edge of said sector-like member, means for gathering the electric current uniformly around the outer circular edge of said sector-like member, means for moving the contactor radially along the surface of said sector-like member, means for positioning said contactor at a known radius, means for adjusting the electric current flowing through said sector-like member, and means for measuring the electric voltage between said contactor and a circular edge of said sector-like member.

NORMAN D. COGGESHALL.

REFERENCES CITED

The following references are of record in the file of this patent:

UNITED STATES PATENTS

| Number | Name | Date |
|---|---|---|
| 1,918,001 | Stone | July 11, 1933 |
| 2,452,664 | Koenig, Jr. | Nov. 2, 1948 |